(12) United States Patent
Parker

(10) Patent No.: US 9,566,991 B2
(45) Date of Patent: Feb. 14, 2017

(54) COLLAPSIBLE PERSONAL TROLLEY

(71) Applicant: Eric G. Parker, Naples, FL (US)

(72) Inventor: Eric G. Parker, Naples, FL (US)

( * ) Notice: Subject to any disclaimer, the term of this patent is extended or adjusted under 35 U.S.C. 154(b) by 0 days.

(21) Appl. No.: 14/855,954

(22) Filed: Sep. 16, 2015

(65) Prior Publication Data
US 2016/0075359 A1    Mar. 17, 2016

Related U.S. Application Data

(60) Provisional application No. 62/050,915, filed on Sep. 16, 2014.

(51) Int. Cl.
| *B62B 1/12* | (2006.01) |
|---|---|
| *B65D 5/00* | (2006.01) |
| *B65D 5/54* | (2006.01) |
| *A47F 13/00* | (2006.01) |
| *B62B 1/26* | (2006.01) |

(52) U.S. Cl.
CPC ............... *B62B 1/12* (2013.01); *A47F 13/00* (2013.01); *B62B 1/26* (2013.01)

(58) Field of Classification Search
CPC .. B62B 1/12; B62B 2501/062; B62B 2205/00; B65D 5/00; B65D 5/54
See application file for complete search history.

(56) References Cited

U.S. PATENT DOCUMENTS

| 3,092,395 | A | * | 6/1963 | Mitty | .................. | B62B 1/12 |
|---|---|---|---|---|---|---|
| | | | | | | 280/14 |
| 3,135,527 | A | | 6/1964 | Knapp | | |
| 3,285,620 | A | | 11/1966 | Mitty | | |
| 4,448,434 | A | | 5/1984 | Anderson | | |
| 5,125,675 | A | * | 6/1992 | Engelbrecht | .............. | B62B 1/12 |
| | | | | | | 229/164 |
| 5,628,523 | A | | 5/1997 | Smith | | |
| 5,803,264 | A | * | 9/1998 | Gersten | ................ | B65D 71/004 |
| | | | | | | 206/194 |
| 6,547,263 | B1 | | 4/2003 | McGeorge | | |
| 6,955,365 | B2 | | 10/2005 | Giampavolo | | |

(Continued)

FOREIGN PATENT DOCUMENTS

| GB | 2247612 A | 3/1992 |
|---|---|---|
| GB | 2441180 A | 2/2008 |

OTHER PUBLICATIONS

Eckla Multi Rolly Gear Carts (Denise) dated Sep. 22, 2011 retrieved from <URL:http://deniseippolito.com/blog/2011/09/22/ecklamultirollygearcarts/>.

(Continued)

*Primary Examiner* — Bryan Evans
(74) *Attorney, Agent, or Firm* — Cook Alex Ltd.

(57) ABSTRACT

A collapsible trolley features a body including a back panel, a shelf panel pivotally attached to a bottom edge of the back panel, a pair of back wing panels pivotally attached one each to opposing side edges of the back panel, a pair of shelf wing panels pivotally attached one each to opposing side edges of the shelf panel and one each to bottom edges of the pair of shelf wing panels. The body is movable between an unfolded use configuration and a folded storage configuration. A latching member is attached to the body and adapted to secure the body in the folded storage configuration. A pair of wheels are also attached to the body.

20 Claims, 14 Drawing Sheets

(56) References Cited

U.S. PATENT DOCUMENTS

| | | |
|---|---|---|
| 7,728,671 B2 | 6/2010 | Blair |
| 2011/0120827 A1 | 5/2011 | Chiu |
| 2012/0049474 A1* | 3/2012 | Del Rosario .......... B62B 1/008 280/47.34 |

OTHER PUBLICATIONS

International Search Report dated Dec. 14, 2015 for International Application No. PCT/US15/50409.
Ruxxac Folding Trolleys retrieved at http://www.handicart.com.au/page.php?page=viewproduct&id=65.

* cited by examiner

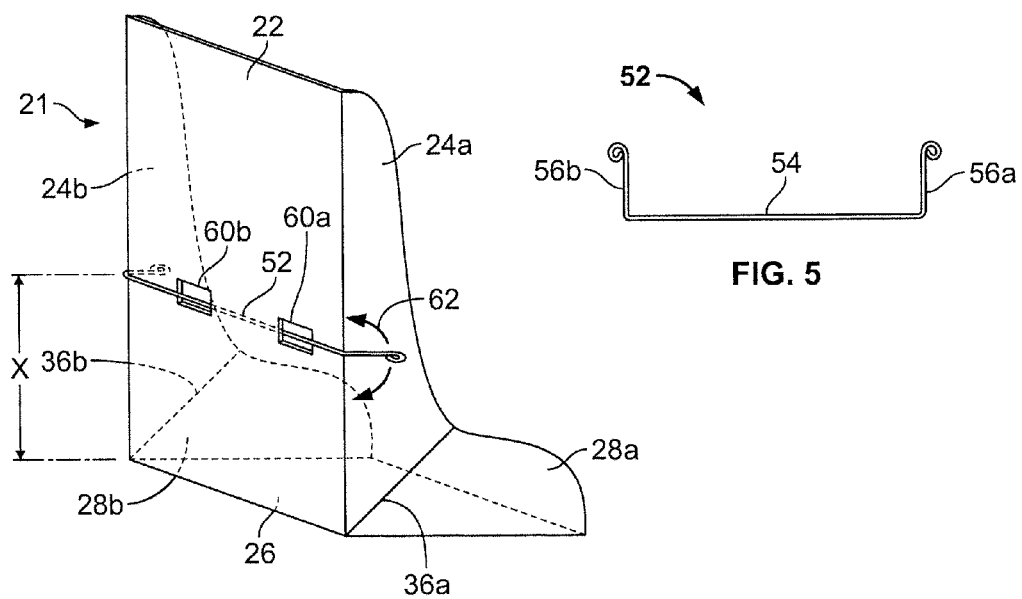
FIG. 4
FIG. 5
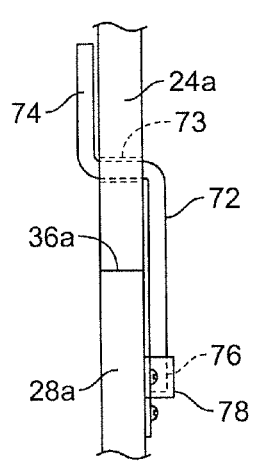
FIG. 6
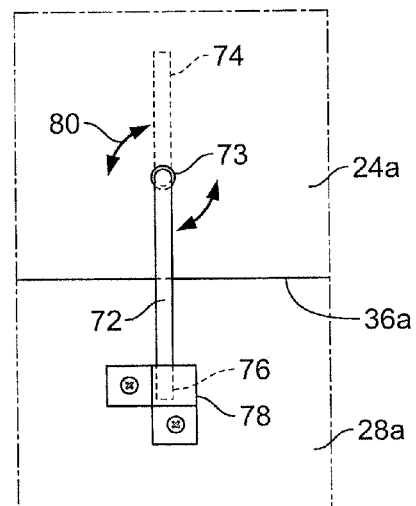
FIG. 7

US 9,566,991 B2

COLLAPSIBLE PERSONAL TROLLEY

CLAIM OF PRIORITY

This application claims priority to U.S. Provisional Patent Application No. 62/050,915, filed Sep. 16, 2014, the contents of which are hereby incorporated by reference.

FIELD OF THE INVENTION

The present invention relates generally to carts for groceries and other retail items and, more particularly, to a collapsible personal trolley.

BACKGROUND

Shoppers in retail stores typically use shopping carts or baskets owned by the store to hold their purchases as they travel through the store. Purchases are typically bagged at the check out counter and either reloaded into the cart or the bags themselves are carried out of the store by the shopper. Carrying the bags is cumbersome for the shopper and the number of bags that a shopper can carry is limited by the strength of his or her arms. With regard to using shopping carts outside of the store, such an arrangement does not work for city shoppers who walk to and from the store. In addition, even if the shopper drives to the store, and carries the groceries to his or her car with a store-owned cart, the store must go to the trouble of collecting the carts from the parking lot. In addition, the carts must be maintained, repaired and stored, which can add up to significant costs and take up valuable storage space.

Consumer-owned folding wire carts for use in shopping are known. The shopper brings the cart to the store, opens/unfolds it, and uses it to hold items during shopping. The shopper then uses the same cart after checkout to transport the purchases to his or her car or home. The disadvantage of such carts, however, is that they can be heavy due to the metal wire construction. In addition, they tend to feature a very utilitarian appearance. They also typically do not fold completely flat, and thus take up valuable space which is undesirable (especially when the shopper is an apartment dweller).

In view of the above, a need exists for a collapsible personal trolley that is inexpensive, lightweight, durable and attractive.

BRIEF DESCRIPTION OF THE DRAWINGS

FIG. 4 is an enlarged rear perspective view of the body of the collapsible personal trolley of FIGS. 1-3 equipped with a pivoting brace;

FIG. 5 is a top plan view of the pivoting brace of FIG. 4;

FIG. 6 is a partial front elevational view of a back wing and a shelf wing of the collapsible personal trolley of FIGS. 1-3 provided with a pivoting lever lock;

FIG. 7 is an interior view of the pivoting lever lock of FIG. 6;

FIG. 22A illustrates the trolley in the fully unfolded use configuration shown in FIG. 21; FIG. 22B illustrates the trolley with the upper portion of the back panel and the shelf panel starting to be folded towards the lower portion of the back panel; FIG. 22C illustrates the trolley with the upper portion of the back panel and the shelf panel nearly completely folded towards the lower portion of the back panel; and FIG. 22D illustrates the trolley in the folded configuration.

DETAILED DESCRIPTION OF EMBODIMENTS

Figure 1:
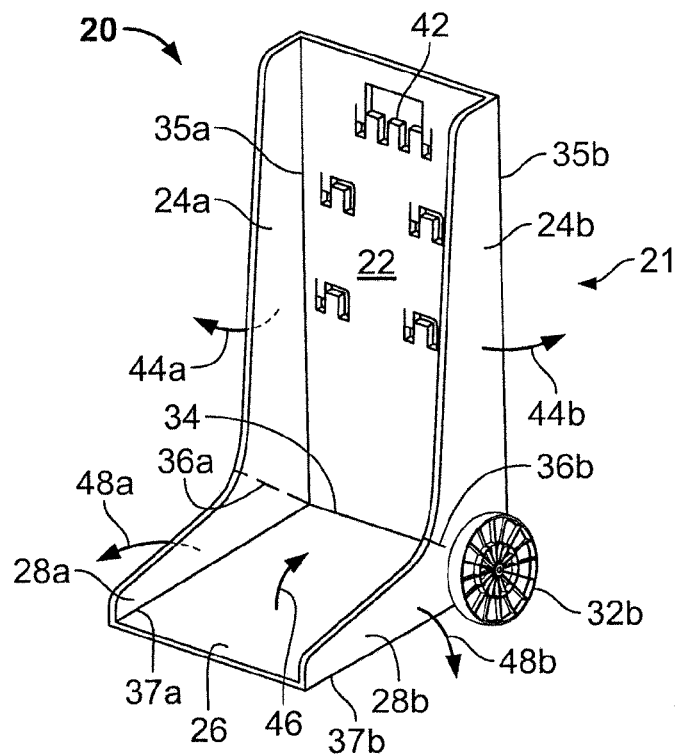
FIG. 1 is a front perspective view of a first embodiment of the collapsible personal trolley of the present invention in an unfolded use configuration.
Figure 2:
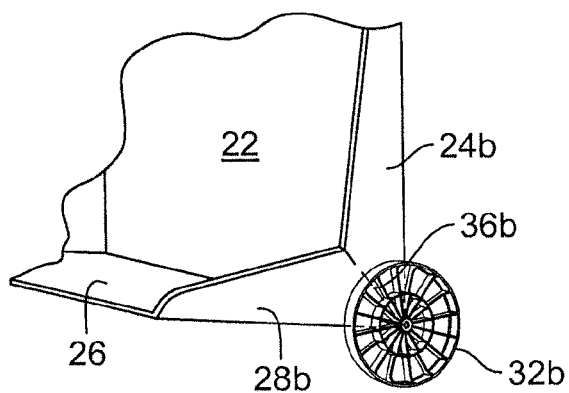
FIG. 2 is a partial front perspective view of the collapsible personal trolley of FIG. 1 in the process of being placed in a folded storage configuration.
Figure 8:
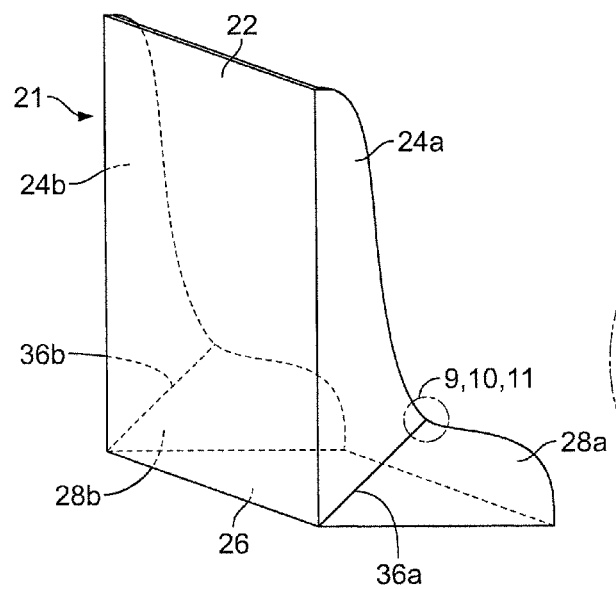
FIG. 8 is an enlarged rear perspective view of the body of the collapsible personal trolley of FIGS. 1-3.

A first embodiment of the collapsible personal trolley of the invention is indicated in general at 20 in FIG. 1. As illustrated in FIGS. 1, 4 and 8, the trolley includes a body, indicated in general at 21, that includes a back panel 22, back wings 24a and 24b, a shelf panel 26 and shelf wings 28a and 28b. Wheels (two) are mounted to the bottom rear portion of the back wings 24a and 24b. The left wheel is indicated at 32b in FIGS. 1-3, while the right wheel, not visible in FIGS. 1 and 2, is indicated at 32a in FIG. 3. In alternative embodiments, the wheels may be mounted to the shelf wings 28a and 28b, the shelf panel 26 or the back panel 22.

The body 21 is preferably constructed from a single piece of corrugated plastic material, but any substantially rigid lightweight sheet material (that is preferably foldable) may be used including, but not limited to, corrugated cardboard, fiberglass, corrugated and non-corrugated composite materials and non-corrugated plastic. Advertising and/or attractive designs may be printed on the sheet of body material.

Figure 3:
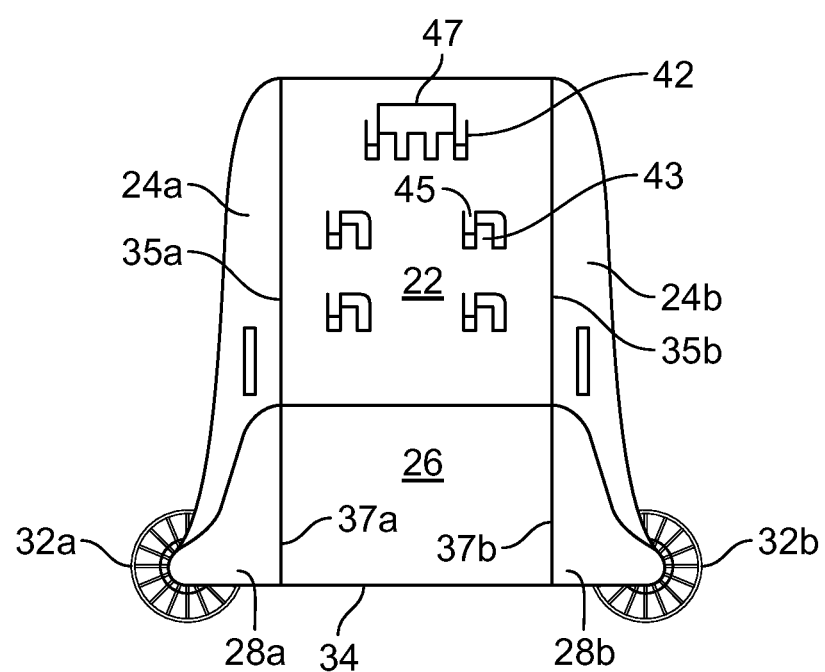
FIG. 3 is a front elevational view of the collapsible personal trolley of FIGS. 1 and 2 in a folded storage configuration.

As illustrated in FIGS. 1 and 3, a primary hinge 34 is formed at the junction of the bottom edge of the back panel 22 and the rear edge of the shelf panel 26. In addition wing-to-wing hinge 36a is formed between back wing 24a and shelf wing 28a while wing-to-wing hinge 36b is formed between back wing 24b and shelf wing 28b. Back wing hinges 35a and 35b are formed between the back panel 22 and back wings 24a and 24b, respectively. Shelf wing hinges 37a and 37b are formed between shelf panel 26 and shelf wings 28a and 28b, respectively. The hinges 34, 35a, 35b, 37a and 37b are preferably living hinges formed by a reduction in material thickness and/or folds in the cart body material, while corresponding edges of the back wings and shelf wings must be joined to form wing-to-wing hinges 36a and 36b. An example of an arrangement for the wing-to-wing hinges 36a and 36b is described below with respect to FIG. 12.

The body may alternatively feature a multi-piece construction with the back panel, shelf panel, back wing and shelf wing secured together by hinges.

The trolley is shown in an unfolded use configuration in FIG. 1. When in this configuration, a shopper may positioned bags and the like on shelf panel 26. In addition, the back panel 22 may be provided with bag-retaining cutouts, such as the one indicated at 42 in FIGS. 1 and 3. With reference to FIG. 3, each cutout is provided with a generally rigid tab 43 from which the handle of a bag may be hung. Positioned adjacent to the generally rigid tab 43 is a flexible cantilever toggle 45 that serves as a latch so that the handle of the bag is retained on the tab. As a result, one or more bags may be hung on the back panel 22.

The shopper may transport the loaded trolley by a user grasping the top handle cutout (47 in FIG. 3) and tilting the top portion backwards at an angle so that it may be rolled along the floor or ground on wheels 32a and 32b.

With reference to FIG. 1, when the user has completed his or her shopping trip, and the bags are removed from the trolley, back wing panels 24a and 24b are pivoted outwards, as indicated by arrows 44a and 44b, about hinges 35a and 35b, respectively. Shelf panel 26 is simultaneously pivoted toward back panel 22, about hinge 34, as illustrated by arrow 46. As this occurs shelf wings 28a and 28b pivot in the directions of arrows 48a and 48b about hinges 37a and 37b, respectively.

FIG. 2 shows the lower left corner of the trolley as it is being transitioned into the folding storage position using the process described above. More specifically wing-to-wing hinge 36b has actuated so that shelf wing 28b is at an angle with regard to back wing 24a while the leading front edge of the shelf panel 26 has been pivoted closer to the back panel 22. Wheel 32b has simultaneously begun pivoting towards a plane that is parallel to the plane of the back panel 22 of the trolley.

FIG. 3 shows the trolley in a folded storage position so as to be generally flat for ease of storage and transport. In this position, shelf panel 26 is parallel to and overlays back panel 22. Shelf wing 28a similarly is parallel to and overlays back wing 24a, while shelf wing 28b is parallel to and overlays back wing 24b. Wheels 32a and 32b lie in a plane that is parallel to the plane of the back panel 22 of the trolley. The trolley may be secured in this position by VELCRO strips placed on corresponding portions of the back and shelf panels or on corresponding portions of the wing panels. Alternative securing arrangements include, but are not limited to, one or more elastic straps or a tab and notch arrangement.

The trolley may feature optional braces and fasteners to assist in locking it into the unfolded use configuration. For example, as illustrated in FIGS. 4 and 5, a pivoting brace 52 may be pivotally attached to the back panel 22 of the trolley body. More specifically, as illustrated in FIG. 5, the pivoting brace is generally U-shaped and has a pivoting axle portion 54 and arms 56a and 56b. The pivoting axle portion 54 is secured to the back of the back panel such as by passing through openings 60a and 60b, which may be formed in the back panel 22. Alternatively, tabs may be formed in the back panel or separate strips may be attached in the positions illustrated for openings 60a and 60b in FIG. 4.

When the trolley is in the unfolded use configuration, as illustrated in FIG. 4, the arms 56a and 56b of the pivoting brace 52 support back wings 24a and 24b to restrict them from pivoting outwards. When it is desirable to fold the trolley into the storage configuration (illustrated in FIG. 3), the pivoting brace 52 may be pivoted as indicated by arrows 62 so that arms 56a and 56b no longer trap back wings 24a and 24b. The pivoting brace 52 may be constructed of any generally rigid material, but preferably is constructed from metal wire. The pivoting brace 52 may positioned at a variety of vertical positions with respect to back panel 22, as indicated by X in FIG. 4.

As illustrated in FIGS. 6 and 7, a pivoting lever lock 72 may be provided so as to pass through an opening 73 in the back wing 24a of the trolley in the vicinity of wing-to-wing hinge 36a so as to provide an arrangement for locking the trolley into the unfolded use configuration illustrated in FIGS. 1 and 4. The pivoting lever lock includes a handle portion 74 and a latching portion 76. Handle portion 74 may be installed so as to be positioned adjacent to either the interior or exterior surface of the back wing 24a, with latching portion 76 positioned adjacent to the exterior or interior surface of the shelf wing 28a, respectively. The handle portion 74 may be moved as indicated by arrows 80 so that the latching portion 76 engages or disengages receptacle 78. When the latching portion 76 is engagement with the receptacle 78, the pivoting lever lock 72 prevents the wing-to-wing hinge 36a from folding or actuating so that the trolley is locked in the unfolded use configuration. Receptacle 78 is optional and may be omitted. Wing-to-wing hinge 36b may be provided with a similar pivoting lever lock.

Figure 9:
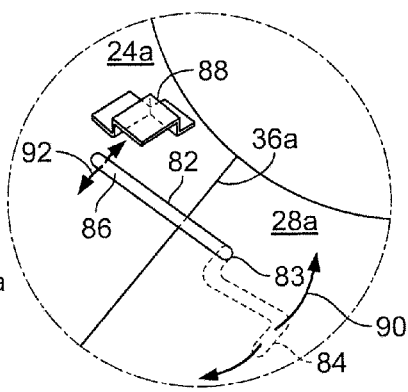
FIG. 9 is an enlarged partial perspective view of the body of FIG. 8 equipped with an alternative embodiment of a pivoting lever lock.

An alternative embodiment of a pivoting lever lock 82 is shown in FIG. 9 and may also be used to prevent the wing-to-wing hinge 36a from actuating when the latching portion 86 is engagement with receptacle 88. Receptacle 88 is optional and may be omitted. The pivoting lever lock 82 passes through an opening 83 in the shelf wing 28a of the trolley. As with the pivoting lever lock of FIGS. 6 and 7, a handle portion 84 of the pivoting lever lock may be used to move the latching portion 86 into and out of engagement with the receptacle, as illustrated by arrows 90 and 92. Handle portion 84 may be installed so as to be positioned adjacent to either the interior or exterior surface of the back wing 24a, with latching portion 86 positioned adjacent to the exterior or interior surface of the shelf wing 28a, respectively. Wing-to-wing hinge 36b may be provided with a similar pivoting lever lock.

Figure 10:
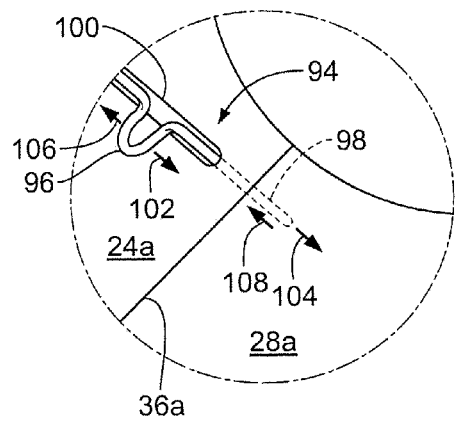
FIG. 10 is an enlarged partial perspective view of the body of FIG. 8 equipped with a sliding lock.

As an alternative to the pivoting lever locks of FIGS. 6, 7 and 9, the wing-to-wing hinges of the trolley may be provided with sliding latch members. A sliding latch member is indicated in general at 94 in FIG. 10, and features a handle portion 96 and a plunger pin 98. When the back wing 24a and the shelf wing 28a features a corrugated construction, the plunger pin 98 may be positioned so as to slide within the back panel 24a with the handle portion 96 protruding through an elongated slot 100. The elongated slot may be formed in either the interior or exterior surface of the back wing 24a. The handle 96 may be moved in the direction of arrow 102 so as to advance the plunger pin 98 into a corresponding bore formed within shelf wing 28a, as indicated by arrow 104. As an alternative to the bore, an external receptacle positioned on the surface of the shelf wing may be used. When in this position, the plunger pin passes across the wing-to-wing hinge 36a to keep it from folding or actuating so as to lock the trolley in the unfolded use configuration. The handle 96 is slid in the direction of arrow 106 to withdraw the plunger pin 98 from shelf wing 28a, as indicated by arrow 108, to permit actuation or folding of the hinge 36a to place the trolley in the folded storage configuration. Wing-to-wing hinge 36b (FIG. 8) may also be provided with a similar sliding latch member.

Figure 11:
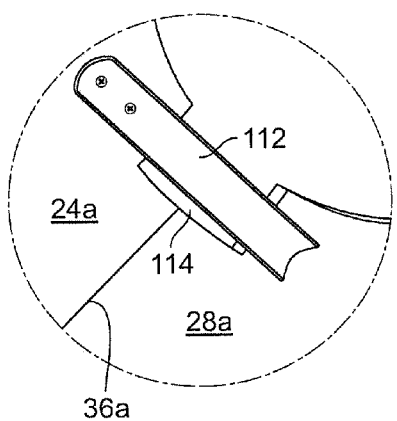
FIG. 11 is an enlarged partial perspective view of the body of FIG. 8 equipped with a spring lock.

As an alternative to the arrangements shown in FIGS. 6, 7, 9 and 10, the wing-to-wing hinges of the trolley may be provided with the negator or cantilever spring indicated at 112 in FIG. 11. The cantilever spring is preferably constructed from a strip of resilient plastic or metal, but any resilient material may be used. As illustrated for wing-to-wing hinge 36a, the proximal end of the spring is attached to the back wing 24a, while the distal end of the spring engages the shelf wing 28a when the trolley is in the unfolded use configuration. Of course, this installation may be reversed with respect to the back and shelf wings. Material is removed from the back wing 24a and shelf wing 28a in the vicinity of the wing-to-wing hinge 36a to form a notch 114. The spring is installed on the exterior surface of the trolley for the version where the back wings and shelf wings fold inward as the trolley is placed in the folded stored configuration (FIG. 3B). In such an embodiment, the spring 112 bends and passes through the notch 114 as the back and seat wings are folded towards the back and shelf of the trolley, respectively. The spring 112 is installed on the interior surface of the trolley for the version where the back wings and shelf wings fold outward as the trolley is placed in the folded stored configuration (FIG. 3A). In such an embodiment, the spring 112 bends and passes through the notch 114 as the back and seat wings are folded away the back and shelf of the trolley, respectively.

In alternative embodiments, the spring 112 of FIG. 11 may be a coil spring that is attached in a fixed fashion at both ends. The distal end of the spring 112 may also travel within a channel formed within the shelf wing 28a or on the surface of shelf wing 28.

Figure 12:
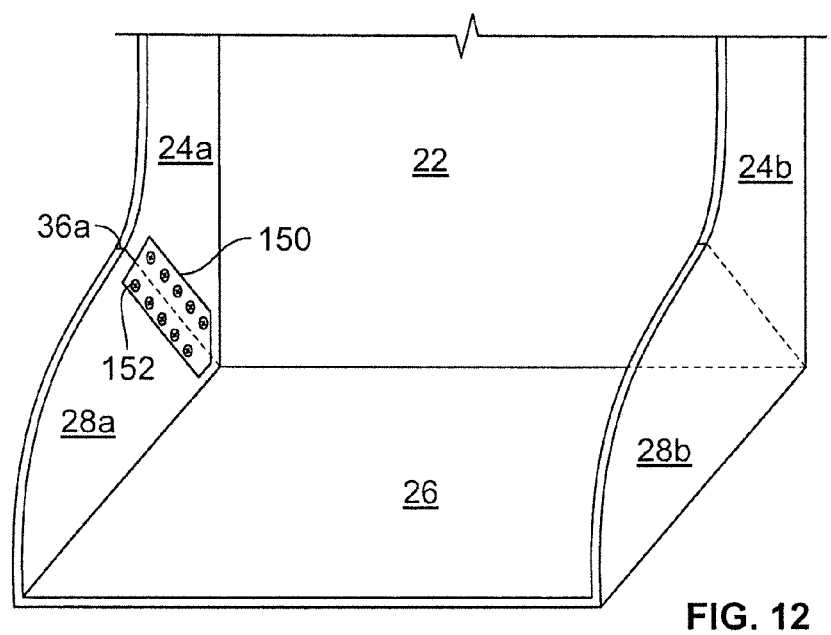
FIG. 12 is an enlarged front partial perspective view of the body of FIGS. 4 and 8 showing a wing-to-wing hinge arrangement.

A front perspective view of wing-to-wing hinge 36a is shown in FIG. 12. A hinge plate 150 is attached to back wing 24a and shelf wing 28a by connectors 152 (which may be screws, rivets or any other suitable fastener). Alternatively, the hinge plate may be secured to the back and shelf wings by adhesive. The hinge plate may be made out of flexible plastic, rubber or any other flexible material so as to form a living hinge that bends at the junction of the back and shelf wings. Alternatively, a traditional metal hinge may be used (such as a piano hinge). Other hinge arrangements known in the prior art may also alternatively be used.

Figure 13:
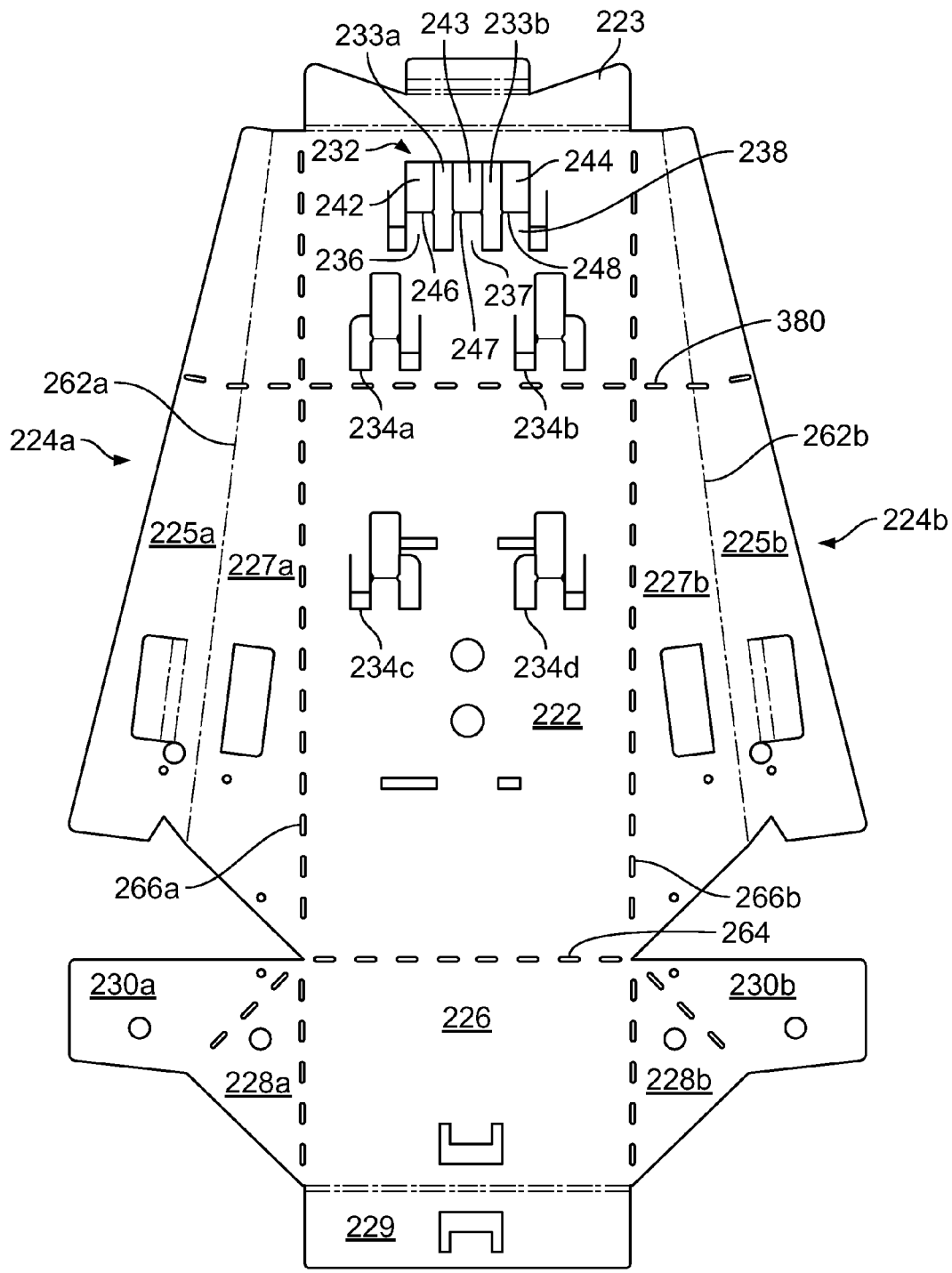
FIG. 13 is a front elevational view of a blank of material used to make an a second or third embodiment of the collapsible personal trolley of the invention.

An example of a blank used to form the body in second or third embodiments of the collapsible trolley is shown in FIG. 13, with a back panel indicated at 222. A top edge support 223 is attached to the back panel. Back wings are indicated in general at 224a and 224b and are formed by panels 225a, 227a and 225b, 227b, as will be explained below. The shelf panel is indicated at 226 and the shelf wings are indicated at 228a and 228b. The shelf panel 226 is provided with a leading edge support panel 229. A pair of wing connector panels 230a and 230b are attached to the shelf wings 228a and 228b.

As shown in FIG. 13, the back panel features a top handle and bag hook cutout indicated in general 232 and bag hook cutouts 234a-234d. The number of cutouts may vary from what is illustrated.

Figure 14:
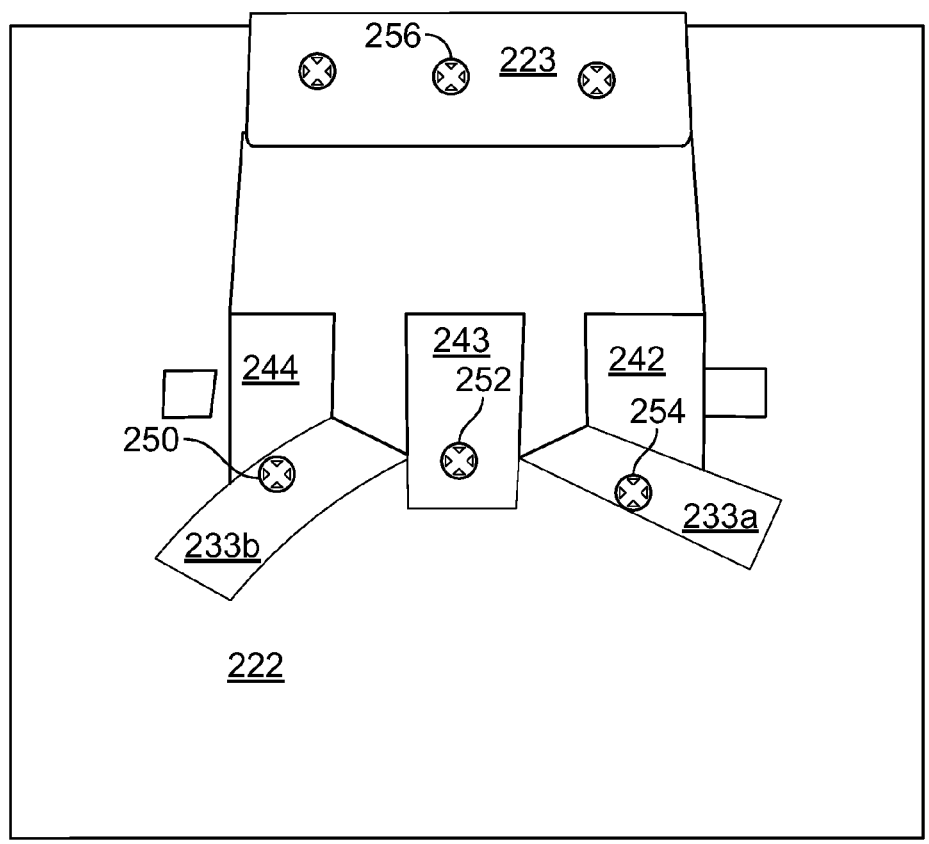
FIG. 14 is a rear elevational view of a top portion of the blank of FIG. 13 with the tabs secured to form the top handle and bag hooks of the collapsible personal trolley.

As shown in FIG. 13, the upper handle and bag hook cutout 232 includes filler strips 233a and 233b. The upper handle and bag hook cutout 232 also includes rigid tabs featuring front portions 236, 237 and 238 and back portions 242, 243 and 244. As shown in FIG. 14, during formation of the trolley body, the filler strips 233a and 233b are folded down and the rigid bag hook tabs are formed by folding back portions 242, 243 and 244 about fold lines 246, 247 and 248 so that they overlap the filler strips and the front portions 236, 237 and 238 of the rigid hooks. As illustrated in FIG. 14, the tabs and strips are secured in this configuration using heat welds 250, 252 and 254. In addition, as illustrated in FIG. 14, the top edge support 223 is folded down and secured in position with heat welds 256 to provide extra strength to the handle portion of the trolley.

The trolley body is further formed from the blank by folding side wing panel 225a about fold line 262a so that it overlays the back side of wing panel 227a. The wing panels 225a and 227a are then secured together by heat welds to form side wing 224a. Wing panel 225b is similarly folded about fold line 262b so that is overlays the back side of wing panel 227b. The wing panels 225b and 227b are then secured together by heat welds to form side wing 224b.

To further form the trolley body, the shelf panel 226 is folded about fold line 264 towards the back panel 222 so as to generally form a right angle with respect to the back panel. In addition, the back wings 224a and 224b are folded forward about fold lines 266a and 266b to form generally right angles with the back panel. The wing connector panels 230a and 230b are then positioned so as to overlay the backsides of the lower portions of the back wings 224a and 224b and are secured in place with heat welds. In addition, the shelf leading edge support panel 229 is folded under the shelf panel 226 and secured in place with heat welds.

Figure 15:
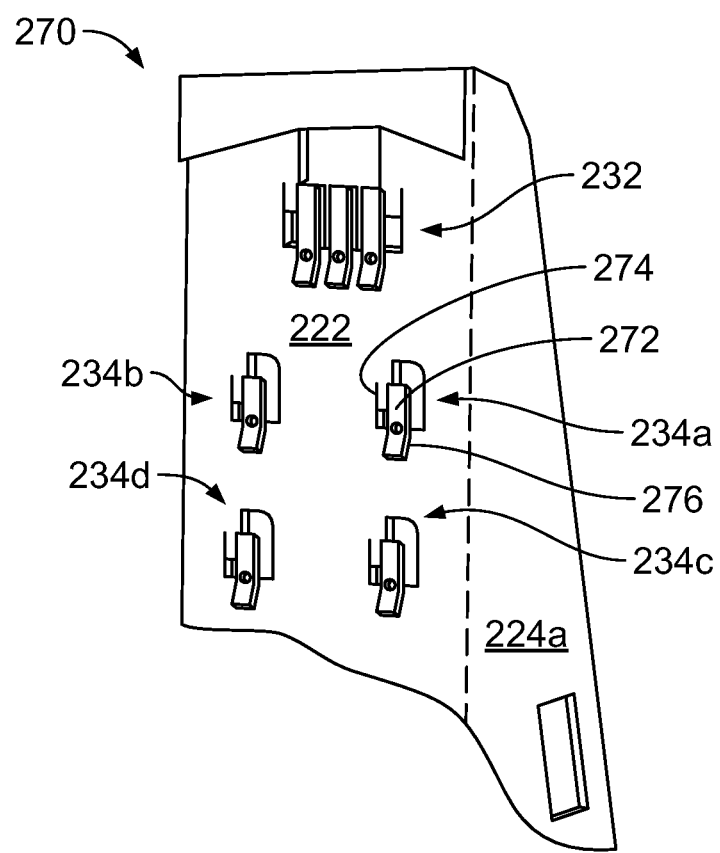
FIG. 15 is a partial rear perspective view of a second embodiment of the collapsible personal trolley featuring a body made from the blank of FIGS. 13 and 14.
Figure 16A:
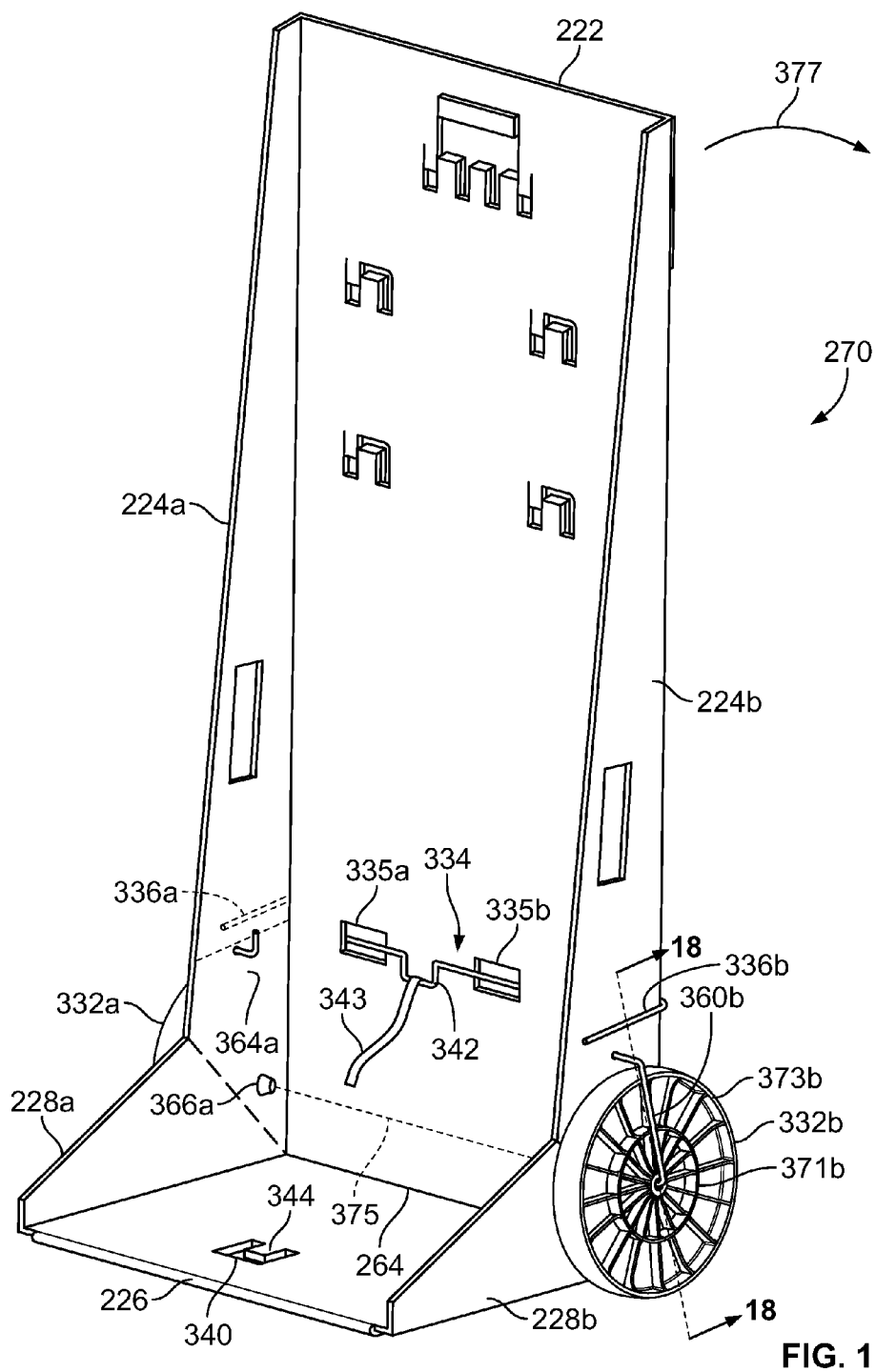
FIG. 16A is a full front perspective view of the collapsible personal trolley of FIG. 15 in an unfolded use configuration.
Figure 16B:
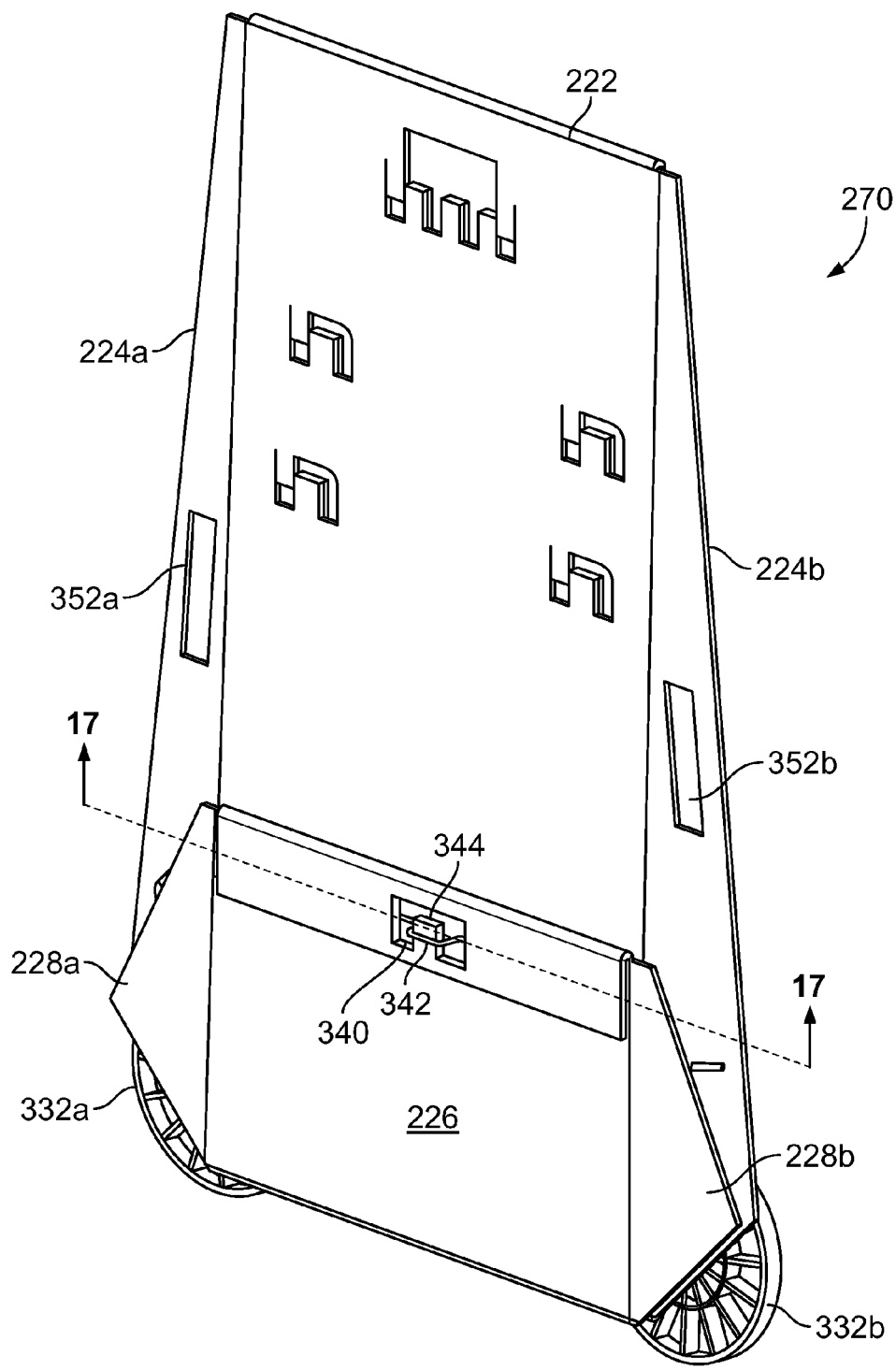
FIG. 16B is a full front perspective view of the collapsible personal trolley of FIG. 16A in a folded storage configuration.

As a result of the folding and securing operations described above, the trolley body indicated in general at 270 in FIGS. 15, 16A and 16B is formed.

With reference to FIG. 15, the assembled bag hooks are indicated in general at 232 and 234b-234c. Using cutout 234 as an example, each cutout is provided with a generally rigid tab 272 (constructed in the manner described above with reference to FIG. 14) from which the handle of a bag may be hung. Positioned adjacent to the rigid tab is a flexible cantilever toggle 274 that serves as a latch so that the handle of the bag is retained on the tab. As a result, one or more bags may be hung on the back panel 222. In addition, due to the foldover construction for the generally rigid tabs illustrated in FIG. 14, each cutout is provided with a hitchhiker tab (illustrated at 276 for cutout 234a in FIG. 15) whereby the trolley may be suspended from a horizontal side wall wire of a traditional shopping cart. As a result, the collapsible trolley may be hung on the side of the shopping cart while the user is shopping in a store.

With reference to FIGS. 16A and 16B, where a second embodiment of the collapsible trolley is shown, as described previously the trolley body includes a back panel 222, back wings 224a and 224b, a shelf panel 226 and shelf wings 228a and 228b. Wheels 332a and 332b are mounted to the bottom rear portion of the back wings 224a and 224b, as will be described in greater detail below.

The back panel, back wings, shelf panel and shelf wings are preferably constructed from a single piece of corrugated plastic material, but any substantially rigid sheet material (that is preferably foldable) may be used including, but not limited to, vacuum formed panels, thermos formed panels, injection molded panels, corrugated cardboard, corrugated and non-corrugated composite materials and non-corrugated plastic. Advertising and/or attractive designs may be printed on the sheet of body material. The body may alternatively feature a multi-piece construction.

A single pivoting wire latching member, indicated in general at 334 in FIG. 16A is pivotally secured to the back wall of the trolley body using slots 335a and 335b, although alternative arrangements known in the art, such as a pair tubes or fasteners secured to the back panel, with straight portions of the latching member passing there through, may be used. As will be explained in greater detail below, the wire latching member pivots between a position corresponding to an unfolded use configuration of the trolley, illustrated in FIG. 16A, and a position corresponding to the folded storage configuration of the trolley, illustrated in FIG. 16B.

With reference to FIG. 16A, the wire latching member 334 features lever portions 336a (shown in phantom) and 336b parallel to one another on opposite ends of wire latching member 334. Lever portions 336a and 336b hold the shelf wings 224a and 224b in securely at an angle of approximately 90° with respect to the back panel 222 and the shelf panel 226 when the cart is in the unfolded use configuration. When the cart is in the unfolded use configuration, the shelf wings 228a and 228b are also at an angle of approximately 90° with respect to the shelf panel 226 and the back panel 222 and generally lay in the same planes as back wings 224a and 224b. Furthermore, the pair of back wing panels and the pair of shelf wing panels cooperate to support the shelf panel 226 so that the shelf panel is at an angle of approximately 90° with respect to the back panel 222. Of course the pivotal attachment/fold line between the back panel and the shelf panel 264 also aids in supporting the shelf panel.

Figure 17:
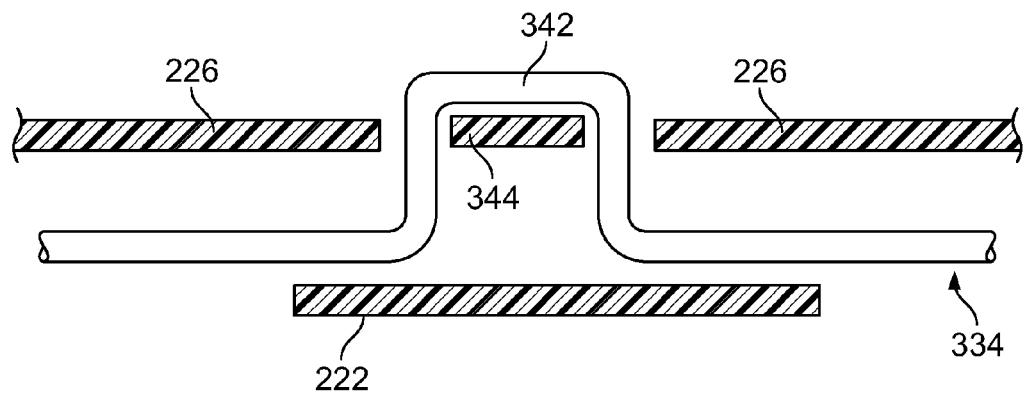
FIG. 17 is an enlarged cross-sectional view of portions of the back panel shelf panel and pivoting brace of FIG. 16B taken along line 17-17.

As indicated in FIGS. 16A and 16B, the shelf panel 226 is provided with a window opening 340. In addition, the latching member 334 is provided with a central offset portion 342 sized to pass through the window 340 as the latching member is rotated from the position illustrated in FIG. 16A to the position illustrated in FIG. 16B. As illustrated in FIGS. 16A and 16B, the back panel 222 of the cart is provided with a tab 344 that is sized to be engaged by the offset portion 342 of the latching member. As a result, when the shelf panel 226 of the cart is folded into a position adjacent to the back panel 222, as illustrated in FIGS. 16B and 17, the latching member 334 may be pivoted, via either lever portion 336a or 336b, into the position illustrated in FIGS. 16B and 17 so that the offset portion 342 engages the tab 344 to latch the trolley in the generally flat, folded configuration for ease of storage or carrying.

As illustrated at 343 in FIG. 16A, a strap may be attached to the offset portion of the latching member to facilitate engagement with the tab 344 during folding.

Back wings 224a and 224b, as illustrated in FIG. 16B, may optionally be provided with handle openings 352a and 352b to facilitate carrying the trolley when it is in the folded configuration.

When user desires to open the cart, he or she rotates the latching member 334 so that the offset portion 342 disengages from the tab 344. As a result, the trolley is free to unfold into the use configuration of FIG. 16A, with the lever portions 336a and 336b pivoting into the positions illustrated in FIG. 16A. Cargo may then be easily carried on the extended shelf panel 226.

Conventionally and universally, wheels run on axles. The axles are fixed and supported perpendicular to the planes of rotation of the wheels. Any side loading in operation is resisted by the wheel axle interface as a moment at the hub typically with a bearing, thus the interface needs to be increasingly robust as anticipated loads are increased.

In the embodiment of the trolley illustrated in FIGS. 16A and 16B, radial loading for wheels 332a and 332b is supported by the axle section but the resistance to side loading is provided in two different ways.

Figure 18:
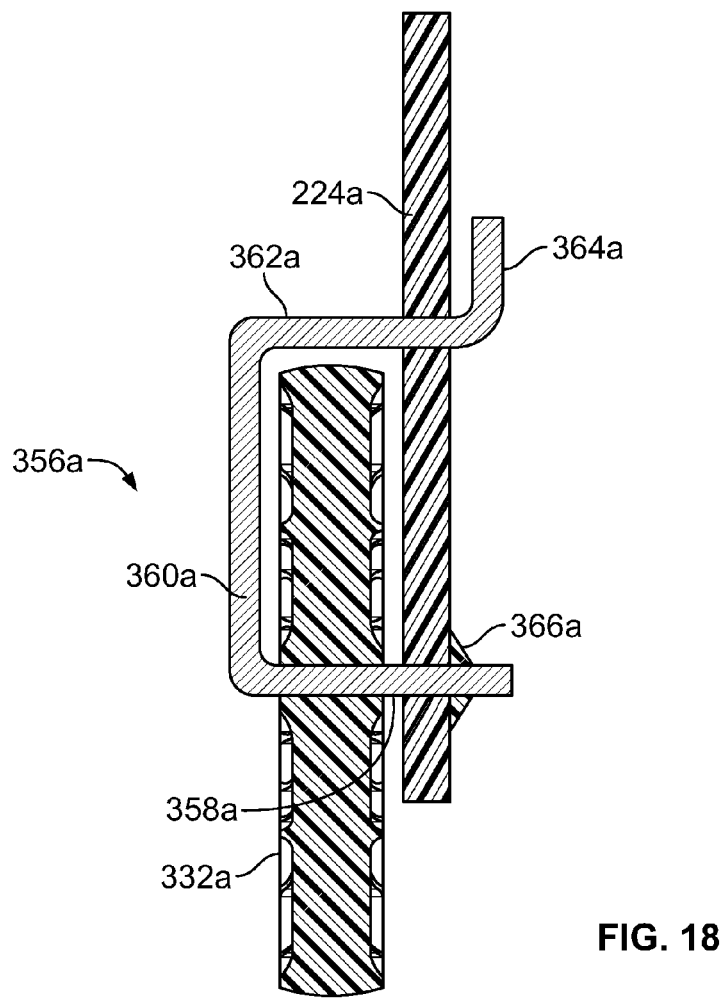
FIG. 18 is an enlarged, cross-sectional view of a wheel fastener and wheel and a lower portion of a back wing of the collapsible personal trolley of FIG. 16A taken along line 18-18.

More specifically, as illustrated in FIG. 18 for wheel 332a, a wheel bracket, indicated in general at 356a, is preferably formed from wire (such as aluminum for light weight or steel) and features a generally horizontal axle portion 358a, a generally vertical abutment portion 360a and a generally horizontal upper mounting portion 362a. The proximal portions of axle portion 358a and upper mounting portion 362a pass through openings formed in the back wing 224a and are secured in place by either a bend, as illustrated at 364a for upper mounting portion 362a, or a retainer, as illustrated at 366a for axle portion 358a.

As illustrated in FIG. 16A (for wheel 332b and vertical abutment portion 360b) and 18, wheel 332a is trapped between back wing 224a, which is in a plane parallel to the wheel 332a, and vertical abutment portion 360a. Exaggerated spacing is shown between the wheel 332a and back wing 224a and between the wheel and the wheel bracket vertical abutment portion 360a in FIG. 18 for ease of illustration. Wheel 332b is mounted to back wing 324b in the same fashion.

As shown in FIG. 16A, wheel 332b, which preferably is formed from molded plastic, includes concentric hub rim 371b and edge rim 373b, both of which are formed on the both the inner and outer faces of the wheel. Wheel 332a features a similar construction. The outward side loads of each wheel are resisted by the abutment portion (360a and 360b) of each wheel bracket which rubs on the hub and edge rims on the outer face of each wheel. The side loads in the other direction are similarly resisted by the hub and edge rims on the inner face of each wheel rubbing on the plane surface of the corresponding back wing. The hub and edge rims reduce wheel surface contact area with respect to the back wings and the wheel brackets and thus minimizes the resistance to rolling.

With reference to FIG. 16A, the effective axle for wheels 332a and 332b, illustrated in phantom at 375 in FIG. 16A, is forward of the back wall panel 222 of the trolley body. This makes it easier for a user to tilt the loaded cart in the direction of arrow 377 of FIG. 16A so that the cart may be easily pulled by the user.

Figure 19:
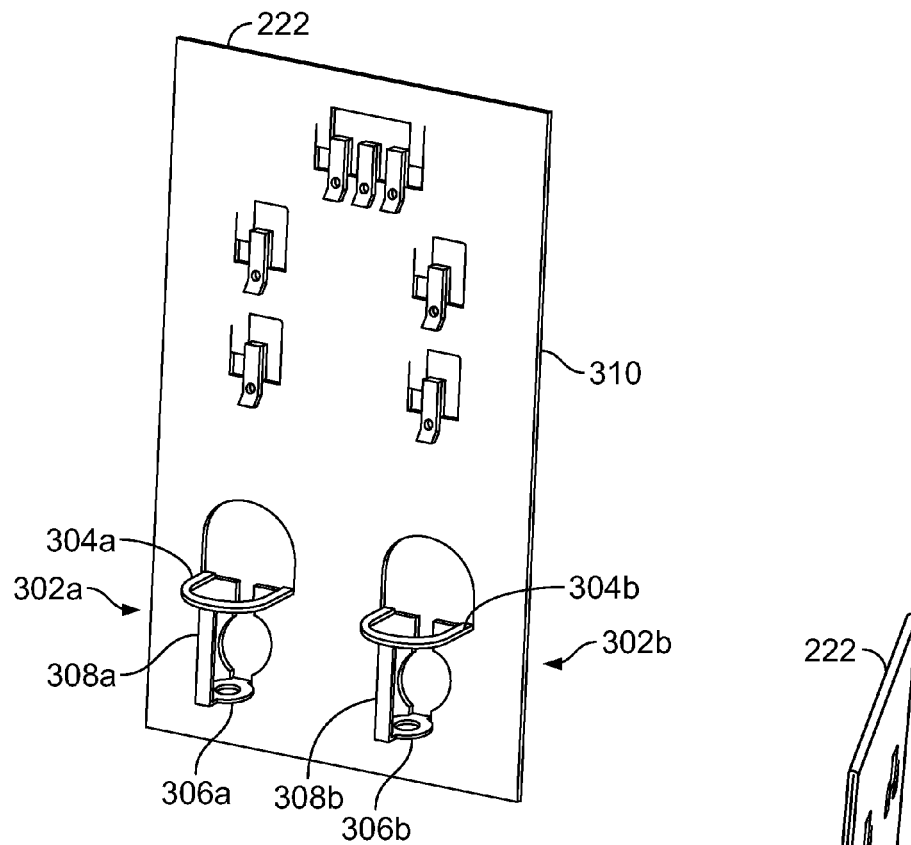
FIG. 19 is a rear perspective view of the back panel of the body of the collapsible personal trolley of FIGS. 15-18 featuring an optional pair of bottle holders.
Figure 20:
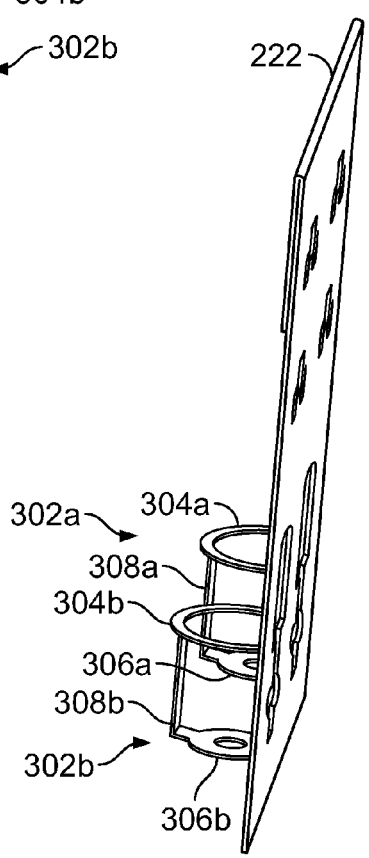
FIG. 20 is a side perspective view of the back panel of FIG. 19.

As illustrated in FIGS. 19 and 20, the back panel 222 of the trolley may be provided with bottle holders, indicated in general at 302a and 302b. Each bottle holder is cut from the back panel 300 so as to include a top ring (304a and 304b), a bottom ring (306a and 306b) and a connector (308a and 308b). The top rings 304a and 304b feature central openings that are large enough to receive a 2-liter bottle of soda or the like. The bottom rings 306a and 306b feature central openings that are sized to receive the necks of inverted wine bottles. As a result, bottle holders 302a and 302b may be used to carry either type of bottle, or any bottle that will engage the central openings of top rings 304a and 304b or bottom rings 306a and 306b.

As illustrated at 380 in FIG. 13, the back panel and back wing panels of the trolley body may optionally be provided with a generally horizontal hinge such as a fold line to form a third embodiment of the collapsible trolley. As illustrated in FIGS. 21 and 22A-22D, this embodiment provides a "tri-fold" arrangement so that the collapsible trolley may be folded into a more compact folded storage configuration.

Figure 21:
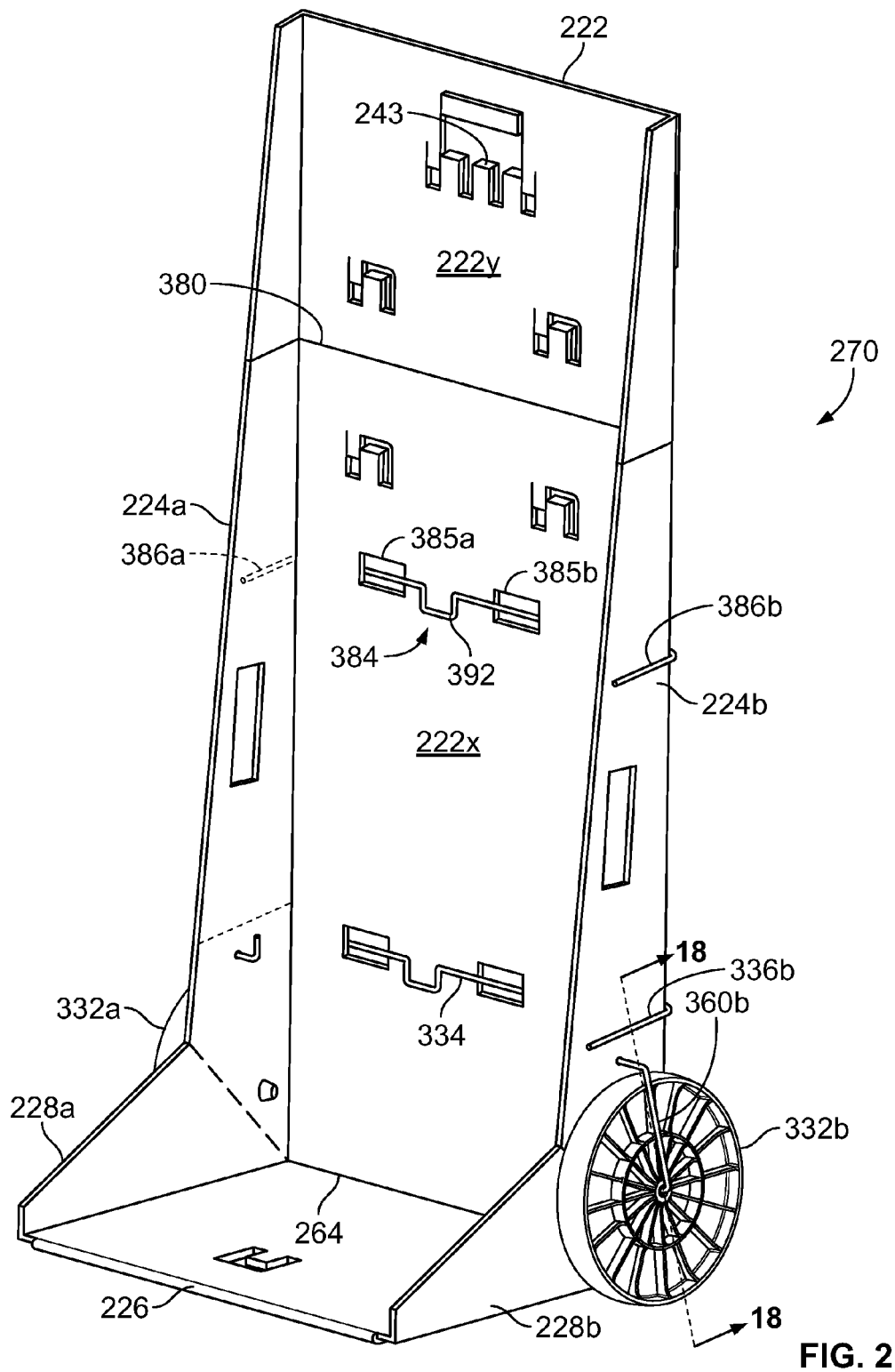
FIG. 21 is a front perspective view of a third embodiment of the collapsible personal trolley featuring a body made from the blank of FIGS. 13 and 14 in an unfolded use configuration.

As illustrated in FIG. 21, in addition to the pivoting wire latching member 334, an upper pivoting wire latching member, indicated in general at 384 is also pivotally secured to the back wall of the trolley body using slots 385a and 385b, although alternative arrangements known in the art, such as a pair tubes or fasteners secured to the back panel, with straight portions of the latching member passing there through, may be used. As with the lower pivoting wire latching member 334, the wire latching member pivots between a position corresponding to an unfolded use configuration of the trolley, illustrated in FIG. 21, and a position corresponding to the folded storage configuration of the trolley, illustrated in FIG. 22D.

With reference to FIG. 21, the wire latching member 384 features lever portions 386a (shown in phantom) and 386b parallel to one another on opposite ends of wire latching member 384. Lever portions 386a and 386b assist in holding the back wings 224a and 224b in securely when the cart is in the unfolded use configuration.

As described previously, the back panel 222 is provided with a window opening that contains tab 243. In addition, the upper latching member 384 is provided with a central offset portion 392. Tab 243 of the back panel is sized to be engaged by the offset portion 392 of the latching member.

Figure 22A:
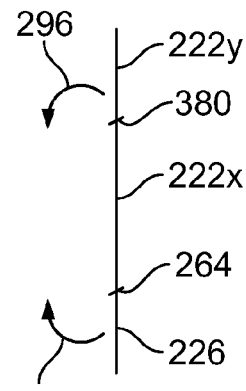
FIGS. 22A-22D are simplified side elevational views of the collapsible personal trolley of FIG. 21 illustrating the procedure for placing the trolley in a folded storage configuration, where
Figure 22B:
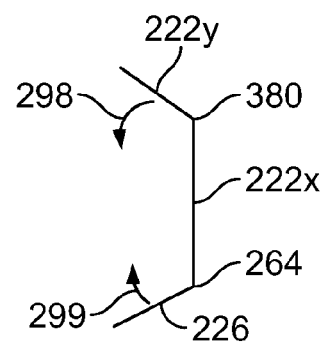
Figure 22C:
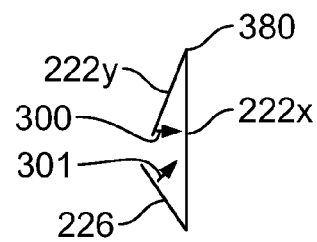

As shown in FIG. 21, fold line 380 divides the back panel into lower portion 222x and upper portion 222y. The folding of the trolley of FIG. 21 will now be explained with reference to simplified FIGS. 22A-22B. FIG. 22A corresponds to the unfolded use configuration of FIG. 21. To begin placing the trolley into the folded configuration (illustrated in FIG. 22D), the upper back panel 222y is folded about fold line 380 (also shown in FIGS. 13 and 21) in the direction of arrow 296 of FIG. 2A. Shelf panel 226 is similarly folded about fold line 264 (also shown in FIGS. 13 and 21) in the direction of arrow 297. As illustrated in FIGS. 22B and 22C, this folding action continues as illustrated by arrows 298, 299 (FIG. 22B) and 300, 301 (FIG. 22C). As a result, the upper back panel 222y and the shelf panel 226 are ultimately positioned adjacent to the lower back panel 222x to provide a compact profile for easy carrying and storage.

Figure 22D:
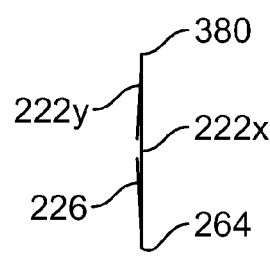

When the shelf panel 226 of the cart is folded into a position adjacent to the lower back panel 222x, the lower latching member 334 may be pivoted, as described above, to latch the shelf panel in the folded configuration (illustrated in FIG. 22D). The upper latching member 384 may similarly be pivoted so that it engages the now adjacent tab 243 of the upper back panel 222y to latch the upper back panel in the folded configuration (illustrated in FIG. 22D).

The embodiments of the collapsible personal trolley described above may be used to easily carry groceries, bags and boxes from the store to a vehicle and from a vehicle to a residence or directly from the store to a residence. They are also useful for home deliveries. The eco-friendly design accepts paper, plastic and cloth bags and boxes. All sides of the body of the trolley may be printed on or customized to provide a pleasing appearance or advertising. When not in use, the trolleys fold flat for easy storage in a vehicle trunk, next to a refrigerator, etc. They are low cost and lightweight yet robust against wear and tear and feature a reliable and easy to use folding motion. Due to the low cost, a store may wish to replace them for the customer. For example, the customer brings an old/used trolley back to the store and exchanges it for a new trolley.

Some of the above design features, such as the axle arrangement, materials and folding panels, could be incorporated into a carrier that folds for overhead storage on an airliner aircraft and then unfolds to carry bottles of wine. As an example only, the unfolded carrier could carry up to twelve bottles of wine. The carrier could optionally include a telescoping, pullout or folding handle so that the carrier could be easily rolled through a winery or an airport terminal.

While the preferred embodiments of the invention have been shown and described, it will be apparent to those skilled in the art that changes and modifications may be made therein without departing from the spirit of the invention, the scope of which is defined by the following claims.

What is claimed is:
1. A collapsible trolley comprising;
  a) a body including:
    i. a back panel;
    ii. a shelf panel pivotally attached to a bottom edge of the back panel;
    iii. a pair of back wing panels pivotally attached one each to opposing side edges of the back panel;
    iv. a pair of shelf wing panels pivotally attached one each to opposing side edges of the shelf panel and one each to bottom edges of the pair of back wing panels;
  b) said body movable between an unfolded use configuration, where the pair of back wing panels, pair of shelf wing panels and the shelf panel are all generally at an angle of approximately 90° with respect to the back panel so that the pair of back wing panels and the pair of shelf wing panels cooperate to support the shelf panel, and a folded storage configuration where the pair of back wing panels are generally in the same plane as the back panel, the pair of shelf wing panels are generally in the same plane as the shelf panel, the shelf panel overlays a portion of the back panel and the shelf wing panels overlay portions of the back wing panels;
  c) a latching member attached to the body and adapted to secure the body in the folded storage configuration; and
  d) a pair of wheels attached to the body.

2. The collapsible trolley of claim 1 wherein the pair of wheels are attached one each to the pair of back wing panels by axles that are generally perpendicular to outer surfaces of the pair of back win panels both when the body is in the unfolded use configuration and when the body is in the folded storage configuration so that the pair of wheels also move between a use configuration and a storage configuration.

3. The collapsible trolley of claim 2 wherein each wheel is attached to a corresponding back wing panel by a wheel bracket having a generally vertical abutment portion sized to traverse a radius of the wheel so that the wheel is trapped between the back wing panel and the vertical abutment portion of the wheel bracket.

4. The collapsible trolley of claim 3 wherein the wheel bracket featuring a generally horizontal axis portion which extends from a bottom end portion of the generally vertical abutment portion and upon which the wheel rotates and a generally horizontal upper mounting portion which extends from a top end portion of the generally vertical abutment portion over a top of the wheel and where the generally horizontal axis portion and the generally horizontal upper mounting portion each has an end that passes through the back wing panel and terminates adjacent to an internal surface of the back wing panel.

5. The collapsible trolley of claim 4 wherein the generally horizontal axle portions of the wheel brackets define an effective axle for the wheels that is positioned forward of the back panel.

6. The collapsible trolley of claim 3 wherein each wheel includes a hub rim and an edge rim on an inner and outer face of the wheel, where the hub and edge rims are concentric and engage the back wing panel and the generally vertical abutment portion.

7. The collapsible trolley of claim 1 wherein the latching member is pivotally attached to the back panel and includes a central offset portion and wherein the shelf panel includes a tab which is sized to be releasably engaged by the central offset portion of the latching member to secure the body in the folded storage configuration.

8. The collapsible trolley of claim 7 wherein the latching member includes a pair of lever portions extending from opposite ends of the latching member, said pair of lever portions engaging the pair of back wing panels when they are in the open use configuration.

9. The collapsible trolley of claim 8 wherein the latching member is constructed from wire.

10. The collapsible trolley of claim 9 wherein the latching member passes through slots formed in the back panel of the body so as to be pivotally attached to the back panel.

11. The collapsible trolley of claim 7 further comprising a pull strap secured to the central offset portion of the latching member.

12. The collapsible trolley of claim 1 wherein the back panel includes a bag hook.

13. The collapsible trolley of claim 12 wherein the back panel features a window within which a bag hook tab is positioned.

14. The collapsible trolley of claim 13 further comprising a cantilever toggle positioned adjacent to the bag hook tab so that a handle of a bag may be locked onto the bag hook tab.

15. The collapsible trolley of claim 13 wherein the bag hook tab is formed from folded over material and wherein a bottom edge of the folded over material forms a hitchhiker tab adapted to engage a horizontal wire of a shopping cart.

16. The collapsible trolley of claim 1 wherein the body is formed from a single sheet of material.

17. The collapsible trolley of claim 1 further comprising a handle cutout formed in a back wing panel.

18. The collapsible trolley of claim 1 further comprising a handle cutout formed in the back panel.

19. The collapsible trolley of claim 1 wherein the back the panel includes a bottle holder including a top ring, a bottom ring and a connector extending between top and bottom rings.

20. The collapsible trolley of claim 1 wherein the back panel includes a generally horizontal hinge so that the back panel is divided into an upper portion and a lower portion, where the portion may be pivoted about the generally horizontal hinge so as to overlay the lower portion to form a back panel folded storage configuration and further comprising an upper latching member attached to the body and adapted to secure the back panel upper and lower portions in the back panel folded configuration.

\* \* \* \* \*